US012723892B2

(12) United States Patent
Tanaka

(10) Patent No.: US 12,723,892 B2
(45) Date of Patent: Sep. 1, 2026

(54) DATA COLLECTING DEVICE, METHOD, COMPUTER PROGRAM, AND DATA COLLECTING SYSTEM FOR COLLECTING DATA

(71) Applicant: Woven by Toyota, Inc., Chuo-ku Tokyo (JP)

(72) Inventor: Masahiro Tanaka, Edogawa-ku Tokyo-to (JP)

(73) Assignee: Woven by Toyota, Inc., Chuo-ku Tokyo (JP)

( * ) Notice: Subject to any disclaimer, the term of this patent is extended or adjusted under 35 U.S.C. 154(b) by 185 days.

(21) Appl. No.: 18/631,717

(22) Filed: Apr. 10, 2024

(65) Prior Publication Data

US 2024/0353237 A1 Oct. 24, 2024

(30) Foreign Application Priority Data

Apr. 20, 2023 (JP) ................................ 2023-069370

(51) Int. Cl.
*G01C 21/00* (2006.01)
*H04L 67/12* (2022.01)
*H04N 7/18* (2006.01)

(52) U.S. Cl.
CPC ..... *G01C 21/3837* (2020.08); *G01C 21/3889* (2020.08); *H04N 7/183* (2013.01); *H04L 67/12* (2013.01)

(58) Field of Classification Search
CPC ............ G01C 21/3837; G01C 21/3889; G01C 21/3815; G01C 21/3841; G01C 21/3848; H04N 7/183; H04N 5/76; H04N 23/57; H04L 67/12; H04L 67/568; G08G 1/0112; G08G 1/04; H04W 4/44; H04W 72/0457; B60W 60/001; B60W 2420/403; B60W 2556/45
USPC .......................................................... 701/533
See application file for complete search history.

(56) References Cited

U.S. PATENT DOCUMENTS

2018/0314901 A1* 11/2018 Suzuki ................... G06V 20/56
2019/0260687 A1* 8/2019 Tauchi .................... H04L 67/12
2020/0068434 A1* 2/2020 Pedersen ................. H04W 4/46
2021/0180981 A1* 6/2021 Matsumoto ............ G06V 20/56
2021/0180982 A1* 6/2021 Watanabe .......... G01C 21/3815
2021/0258750 A1* 8/2021 Otaka ................. H04W 72/569
(Continued)

FOREIGN PATENT DOCUMENTS

CN 100511320 C * 7/2009 ........... G08G 1/0104
JP 2009181547 A * 8/2009
(Continued)

*Primary Examiner* — Hunter B Lonsberry
*Assistant Examiner* — Helen Li
(74) *Attorney, Agent, or Firm* — Dinsmore & Shohl LLP

(57) ABSTRACT

A data collecting device includes a processor configured to store an image representing an area around a vehicle and generated by a camera mounted on the vehicle during travel of the vehicle 2 in a memory, generate probe data representing a predetermined feature detected from the image in the area around the vehicle, store the generated probe data in the memory, set a probe communication band, depending on the amount of a set of probe data stored in the memory, and transmit the set of probe data to a server via a communication device, using the probe communication band, prior to a set of images stored in the memory.

6 Claims, 8 Drawing Sheets

(56) References Cited

U.S. PATENT DOCUMENTS

| | | | | |
|---|---|---|---|---|
| 2023/0089023 | A1* | 3/2023 | Mizoguchi | G05D 1/0077 701/2 |
| 2023/0300226 | A1* | 9/2023 | Hoshino | H04L 69/22 709/224 |

FOREIGN PATENT DOCUMENTS

| | | | | | |
|---|---|---|---|---|---|
| JP | 2011-097351 | A | | 5/2011 | |
| JP | 2017045129 | A | * | 3/2017 | |
| JP | 2019-144655 | A | | 8/2019 | |
| JP | 2019-176311 | A | | 10/2019 | |
| WO | WO-2020070861 | A1 | * | 4/2020 | H04L 67/12 |

* cited by examiner 4
1
5

6
2
3

PROCESSOR
IMAGES
POSITIONING INFORMATION, etc.
IMAGE STORING UNIT
41
IMAGES (TO MEMORY)
DETECTION UNIT
42
PROBE DATA (TO MEMORY)
THE AMOUNT OF UNTRANSMITTED PROBE DATA
COMMUNICATION BAND SETTING UNIT
43
PROBE DATA & IMAGES (FROM MEMORY)
COMMUNICATION PROCESSING UNIT
44
PROBE DATA & IMAGES (TO WIRELESS COMMUNICATION TERMINAL)
33

R0 < Th
PD(60[s])
IMG(60[s])
PD
IMG
S1
S2
S1
S2
F
F
TIME

R0 ≥ Th
PD(120[s])
IMG(54[s])
PD
IMG
S1
S2
S1
S2
F
F
TIME

FIG. 6

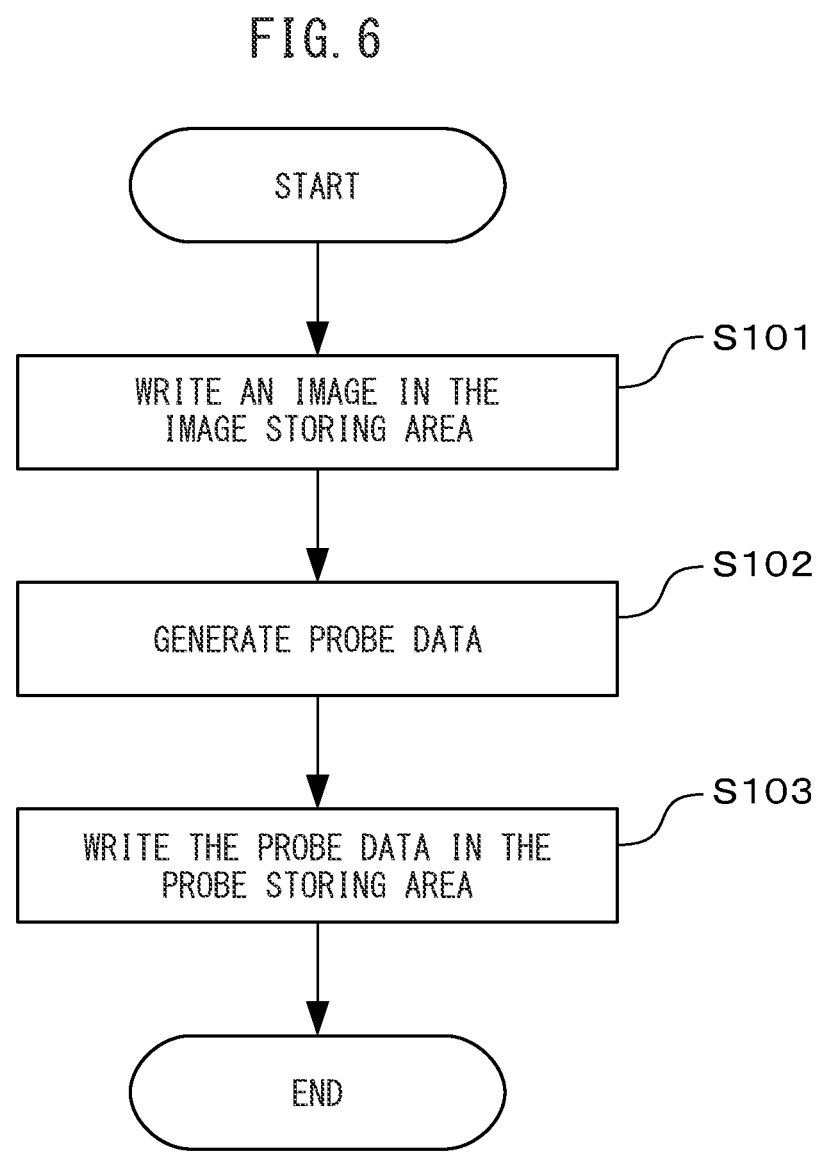

START

S101
WRITE AN IMAGE IN THE IMAGE STORING AREA

S102
GENERATE PROBE DATA

S103
WRITE THE PROBE DATA IN THE PROBE STORING AREA

END

DATA COLLECTING DEVICE, METHOD, COMPUTER PROGRAM, AND DATA COLLECTING SYSTEM FOR COLLECTING DATA

CROSS-REFERENCE TO RELATED APPLICATION

This application claims priority to Japanese Patent Application No. 2023-069370 filed on Apr. 20, 2023, the entire contents of which are herein incorporated by reference.

FIELD

The present disclosure relates to a data collecting device, a method, a computer program, and a data collecting system for collecting data used for generating or updating a map.

BACKGROUND

High-precision maps to which an autonomous vehicle-driving system refers for autonomous driving control of a vehicle are required to represent information on roads accurately. Thus, data representing features on or around a road in a predetermined region, which is obtained by a sensor mounted on a vehicle that has actually traveled in the predetermined region, is collected from the vehicle. However, there is a limit to channel capacity of a communication channel between a vehicle and a server. For this reason, the capacity of storage for temporarily storing data on the vehicle side may be insufficient in some cases, and data may be deleted from the storage before transmission to the server. In view of this, a technique for uploading sensor information of a vehicle-mounted sensor to an external device in an appropriate order, depending on the change in line speed of a communication channel between a vehicle-mounted device and the external device, in collection of data detected by a vehicle has been proposed (see Japanese Unexamined Patent Publication JP2019-176311A).

In a technique disclosed in JP2019-176311A, a vehicle-mounted device determines which of the result of analysis of sensor information and the sensor information is to be preferentially transmitted, based on line speed information of a communication channel. Depending on the result of this determination, the vehicle-mounted device preferentially transmits the result of analysis or the sensor information.

SUMMARY

Interruption of transmission of data midway in a road section where feature-representing data is collected may result in data collected on a server side being insufficient.

It is an object of the present disclosure to provide a data collecting device that can transmit a set of feature-representing data obtained over a continuous section of a certain length to another device without loss.

According to an embodiment, a data collecting device is provided, and which includes a processor configured to: store an image representing an area around a vehicle and generated by a camera mounted on the vehicle during travel of the vehicle in a memory, detect a predetermined feature from the image, generate probe data representing the detected feature, store the generated probe data in the memory, set a probe communication band in a communication band of a communication channel between a communication device mounted on the vehicle and a server, depending on the amount of a set of the probe data stored in the memory, so that all of the set of the probe data is transmitted to the server via the communication device, transmit the set of the probe data to the server via the communication device, using the probe communication band, prior to a set of the images stored in the memory, and transmit the set of the images to the server via the communication device, using a remaining communication band other than the probe communication band in the communication band of the communication channel.

In some embodiments, when the image generated during travel of the vehicle in a collection target region and untransmitted is stored in the memory after transmission to the server of a set of the probe data generated over a section passing through the collection target region and having a predetermined length, the processor of the data collecting device transmits the untransmitted image to the server via the communication device prior to other probe data stored in the memory.

In some embodiment, the processor of the data collecting device widens the probe communication band as the amount of the set of the probe data stored in the memory increases.

In some embodiment, when the ratio of the amount of the set of the probe data to a storage area for storing the probe data in the memory is not less than a predetermined threshold, the processor sets the probe communication band so that the amount of the probe data that is transmitted to the server per unit time is greater than the amount of the probe data stored in the storage area per unit time in a most recent predetermined period.

According to another embodiment, a method for collecting data is provided. The method includes storing an image representing an area around a vehicle and generated by a camera mounted on the vehicle during travel of the vehicle in a memory; detecting a predetermined feature from the image; generating probe data representing the detected feature; storing the generated probe data in the memory; setting a probe communication band in a communication band of a communication channel between a communication device mounted on the vehicle and a server, depending on the amount of a set of the probe data stored in the memory, so that all of the set of the probe data is transmitted to the server via the communication device; transmitting the set of the probe data to the server via the communication device, using the probe communication band, prior to a set of the images stored in the memory; and transmitting the set of the images to the server via the communication device, using a remaining communication band other than the probe communication band in the communication band of the communication channel.

According to still another embodiment, a non-transitory recording medium that stores a computer program for collecting data is provided. The computer program includes instructions causing a processor mounted on a vehicle to execute a process including storing an image representing an area around the vehicle and generated by a camera mounted on the vehicle during travel of the vehicle in a memory; detecting a predetermined feature from the image; generating probe data representing the detected feature; storing the generated probe data in the memory; setting a probe communication band in a communication band of a communication channel between a communication device mounted on the vehicle and a server, depending on the amount of a set of the probe data stored in the memory, so that all of the set of the probe data is transmitted to the server via the communication device; transmitting the set of the probe data to the server via the communication device, using the probe communication band, prior to a set of the images stored in the memory; and transmitting the set of the images to the server via the communication device, using a remaining communication band other than the probe communication band in the communication band of the communication channel.

According to yet another embodiment, a data collecting system including a data collecting device and a server communicably connected to the data collecting device is provided. In the data collecting system, the data collecting device is mounted on a vehicle, and includes a memory; and a processor configured to store an image representing an area around the vehicle and generated by a camera mounted on the vehicle during travel of the vehicle in the memory, detect a predetermined feature from the image, generate probe data representing the detected feature, store the generated probe data in the memory, set a probe communication band in a communication band of a communication channel between a communication device mounted on the vehicle and the server, depending on the amount of a set of the probe data stored in the memory, so that all of the set of the probe data is transmitted to the server via the communication device, transmit the set of the probe data to the server via the communication device, using the probe communication band, prior to a set of the images stored in the memory, and transmit the set of the images to the server via the communication device, using a remaining communication band other than the probe communication band in the communication band of the communication channel.

The data collecting device according to the present disclosure has an advantageous effect of being able to transmit a set of feature-representing data obtained over a continuous section of a certain length to another device without loss.

BRIEF DESCRIPTION OF DRAWINGS

FIG. 6 is an operation flowchart of a process related to generation of probe data and storage of probe data and images in a data collecting process.

DESCRIPTION OF EMBODIMENTS

A data collecting device, a method and a computer program for collecting data executed by the data collecting device, and a data collecting system will now be described with reference to the attached drawings. The data collecting device is mounted on a vehicle, and generates data representing a predetermined feature on or around a road (hereafter "probe data") used for generating or updating a map, based on an image representing an area around the vehicle.

The data collecting device transmits probe data generated during travel of the vehicle in a collection target region to a server via a communication device. To this end, the data collecting device sets a communication band used for transmitting probe data in a communication band of a communication channel between the communication device and the server. The data collecting device transmits a set of probe data generated in a collection target region and stored in a memory to the server, using the set communication band, prior to other collection target data stored in the memory. In addition, the data collecting device transmits other collection target data, such as images, to the server, using the remaining communication band usable for transmitting collection target data in the communication band of the communication channel.

Figure 1:
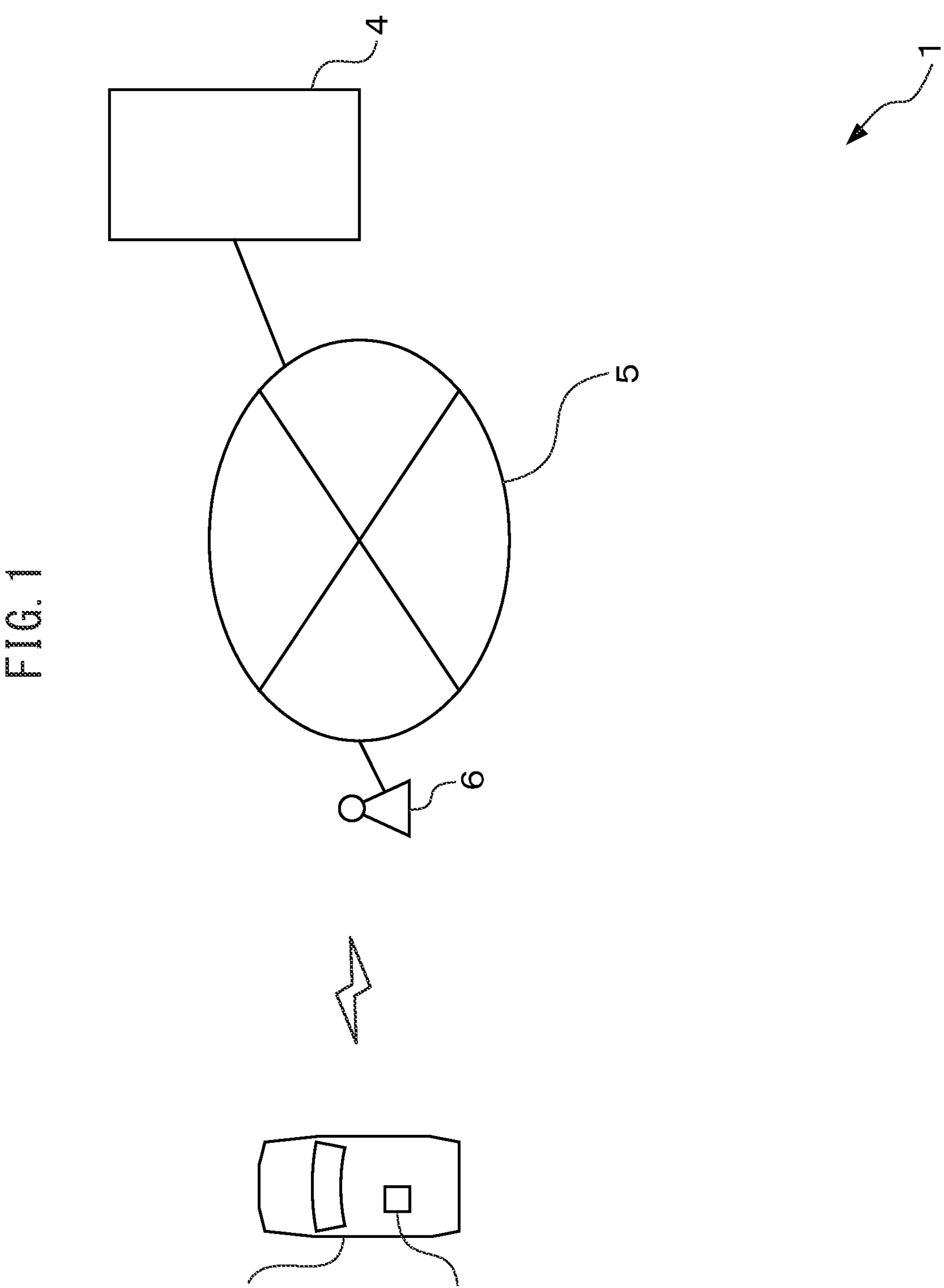
FIG. 1 schematically illustrates the configuration of a data collecting system equipped with a data collecting device.

FIG. 1 schematically illustrates the configuration of a data collecting system equipped with the data collecting device. In the present embodiment, the data collecting system 1 includes a data collecting device 3 mounted on at least one vehicle 2 as well as a server 4. The data collecting device 3 accesses a wireless base station 6, which is connected, for example, via a gateway (not illustrated) to a communication network 5 connected with the server 4, thereby connecting to the server 4 via the wireless base station 6 and the communication network 5. FIG. 1 illustrates only a single vehicle 2, but the data collecting system 1 may include multiple vehicles 2 each equipped with a data collecting device 3. Similarly, the communication network 5 may be connected with multiple wireless base stations 6.

First, the vehicle 2 and the data collecting device 3 will be described. The data collecting system 1 may include multiple vehicles 2 each equipped with a data collecting device 3 as described above, but the following describes a single vehicle 2 and a single data collecting device 3 because each vehicle 2 and each data collecting device 3 have the same configuration and execute the same processing in relation to a data collecting process.

Figure 2:
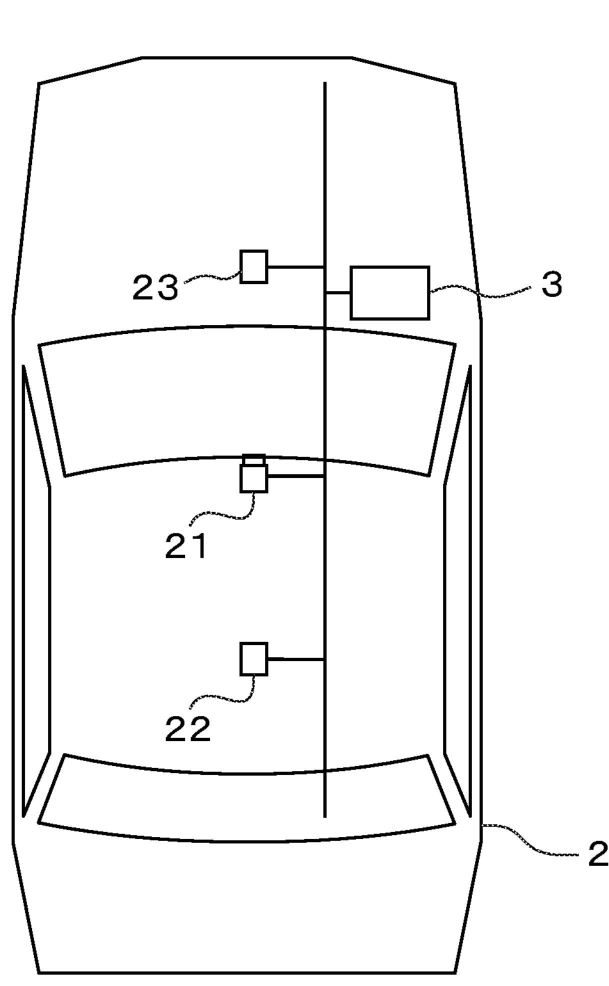
FIG. 2 schematically illustrates the configuration of a vehicle.

FIG. 2 schematically illustrates the configuration of the vehicle 2. The vehicle 2 includes a camera 21 for taking pictures of an area around the vehicle 2, a GPS receiver 22, and a wireless communication terminal 23, in addition to the data collecting device 3. The camera 21, the GPS receiver 22, the wireless communication terminal 23, and the data collecting device 3 are communicably connected via an in-vehicle network conforming to a standard such as a controller area network. The vehicle 2 may further include a range sensor (not illustrated) for measuring the distance to an object in an area around the vehicle 2, such as a LiDAR sensor.

The camera 21, which is an example of an image capturing unit, includes a two-dimensional detector constructed from an array of optoelectronic transducers, such as CCD or C-MOS, having sensitivity to visible light and a focusing optical system that forms an image of a target region on the two-dimensional detector. The camera 21 is mounted, for example, in the interior of the vehicle 2 so as to be oriented, for example, to the front of the vehicle 2. The camera 21 takes pictures of a region in front of the vehicle 2 every predetermined capturing period (e.g., 1/30 to 1/10 seconds), and generates images representing the region. The images obtained by the camera 21 may be color or grayscale images. The vehicle 2 may include multiple cameras 21 taking pictures in different orientations or having different focal lengths.

Every time an image is generated, the camera 21 outputs the generated image to the data collecting device 3 via the in-vehicle network.

The GPS receiver 22 receives GPS signals from GPS satellites at predetermined intervals, and determines the position of the vehicle 2, based on the received GPS signals. The GPS receiver 22 outputs positioning information indicating the result of determination of the position of the vehicle 2 based on the GPS signals to the data collecting device 3 via the in-vehicle network at predetermined intervals. Instead of the GPS receiver 22, the vehicle 2 may include a receiver conforming to another satellite positioning system. In this case, the receiver determines the position of the vehicle 2.

The wireless communication terminal 23, which is an example of the communication device, is a device to execute a wireless communication process conforming to a predetermined standard of wireless communication, and accesses, for example, the wireless base station 6 to connect to the server 4 via the wireless base station 6 and the communication network 5. In other words, a communication channel is established between the wireless communication terminal 23 and the server 4 via the wireless base station 6 and the communication network 5. The wireless communication terminal 23 receives a downlink radio signal including a collection instruction signal or a signal indicating a collection target region from the server 4, and outputs the received signal to the data collecting device 3. Further, the wireless communication terminal 23 generates an uplink radio signal including collection target data of a specified type (e.g., probe data or an image) received from the data collecting device 3. The wireless communication terminal 23 transmits the uplink radio signal to the wireless base station 6, thereby transmitting the collection target data to the server 4. In addition, every time a connection with the wireless base station 6 is established or every time a communication band usable between the wireless base station 6 and the wireless communication terminal 23 varies, the wireless communication terminal 23 notifies the data collecting device 3 of information indicating a communication band usable by the data collecting device 3 for transmitting collection target data between the wireless base station 6 and the wireless communication terminal 23. The communication band usable for transmitting collection target data between the wireless base station 6 and the wireless communication terminal 23 is substantially a communication band usable for the transmission between the server 4 and the wireless communication terminal 23.

Figure 3:
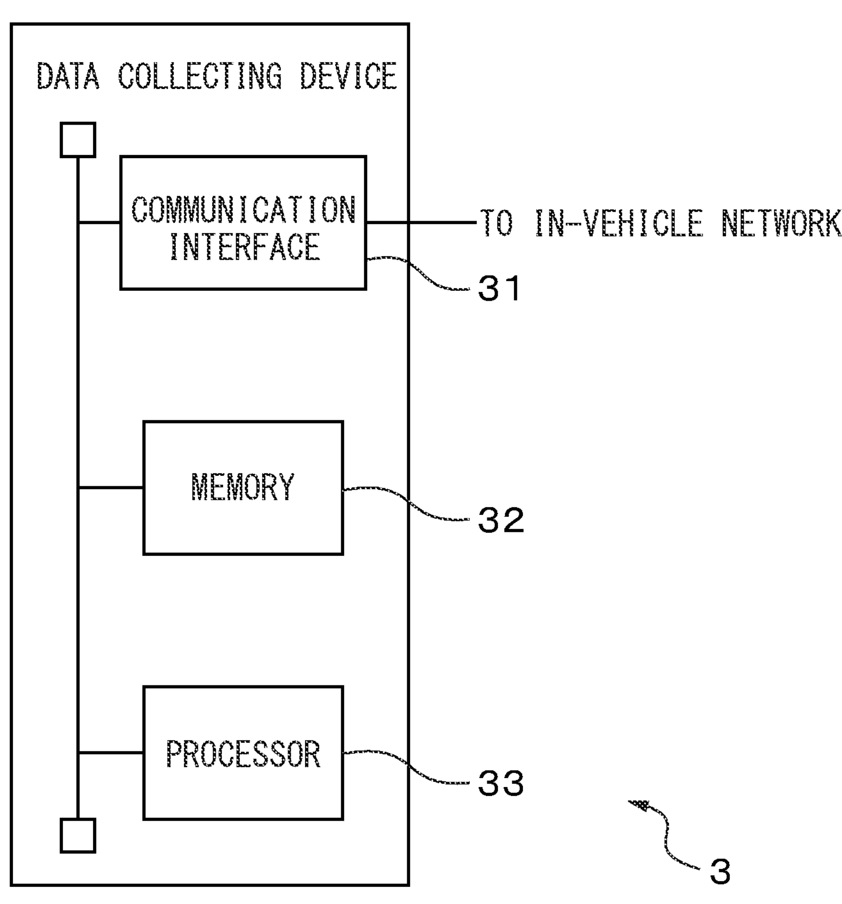
FIG. 3 illustrates the hardware configuration of the data collecting device according to an embodiment.

FIG. 3 illustrates the hardware configuration of the data collecting device 3. The data collecting device 3 temporarily stores images received from the camera 21. In addition, the data collecting device 3 generates probe data, based on, for example, the images, and temporarily stores the generated probe data. The data collecting device 3 transmits the probe data and the images to the server 4 via the wireless communication terminal 23. To achieve this, the data collecting device 3 includes a communication interface 31, a memory 32, and a processor 33.

The communication interface 31, which is an example of an in-vehicle communication unit, includes an interface circuit for connecting the data collecting device 3 to the in-vehicle network. In other words, the communication interface 31 is connected to the camera 21, the GPS receiver 22, and the wireless communication terminal 23 via the in-vehicle network. Every time an image is received from the camera 21, the communication interface 31 passes the received image to the processor 33. Every time positioning information is received from the GPS receiver 22, the communication interface 31 passes the received positioning information to the processor 33. Every time information from the server 4, such as a collection instruction signal, is received from the wireless communication terminal 23, the communication interface 31 passes the information to the processor 33. Further, when information indicating a communication band usable for wireless communication between the wireless communication terminal 23 and the wireless base station 6 is received from the wireless communication terminal 23, the communication interface 31 passes the information to the processor 33. Further, the communication interface 31 outputs data received from the processor 33, such as collection target data, to the wireless communication terminal 23 via the in-vehicle network.

The memory 32, which is an example of the storage unit, includes, for example, volatile and nonvolatile semiconductor memories. The memory 32 may further include other storage, such as a hard disk drive. The memory 32 stores various types of data used in a process related to data collection executed by the processor 33 of the data collecting device 3. For example, the memory 32 stores identifying information of the vehicle 2, parameters of the camera 21, such as the focal length, the orientation, and the mounted position of the camera 21, various parameters for specifying a classifier for detecting a feature from an image received from the camera 21, and positioning information received from the GPS receiver 22. The memory 32 further stores information indicating a collection target region received from the server 4. The memory 32 may further store a computer program for implementing processes executed by the processor 33. Further, the memory 32 stores communication band information indicating a communication band usable by the data collecting device 3 in a communication channel between the wireless communication terminal 23 and the server 4.

The memory 32 includes a storage area for storing images (hereafter an "image storing area") and a storage area for storing probe data (hereafter a "probe storing area"). In some embodiment, the ratio between the sizes of the image storing area and the probe storing area is set so that both images and probe data generated on the same road section can be stored. To achieve this, the ratio between the sizes of the image storing area and the probe storing area is set depending on the data size of an image, the period of acquisition of images from the camera 21, the data size of probe data, and the frequency of generation of probe data. For example, assume that the ratio between the data sizes of an image and probe data obtained per unit time is 100:1, and that the ratio between the frequencies of acquisition of images and generation of probe data is 1:10. In this case, the ratio between the sizes of the image storing area and the probe storing area is set to 10:1. Images received by the data collecting device 3 from the camera 21 are temporarily stored in the image storing area. Probe data generated by the processor 33 is temporarily stored in the probe storing area.

The processor 33 includes one or more central processing units (CPUs) and a peripheral circuit thereof. The processor 33 may further include another operating circuit, such as a logic-arithmetic unit, an arithmetic unit, or a graphics processing unit. The processor 33 executes a data collecting process during travel of the vehicle 2.

Figure 4:
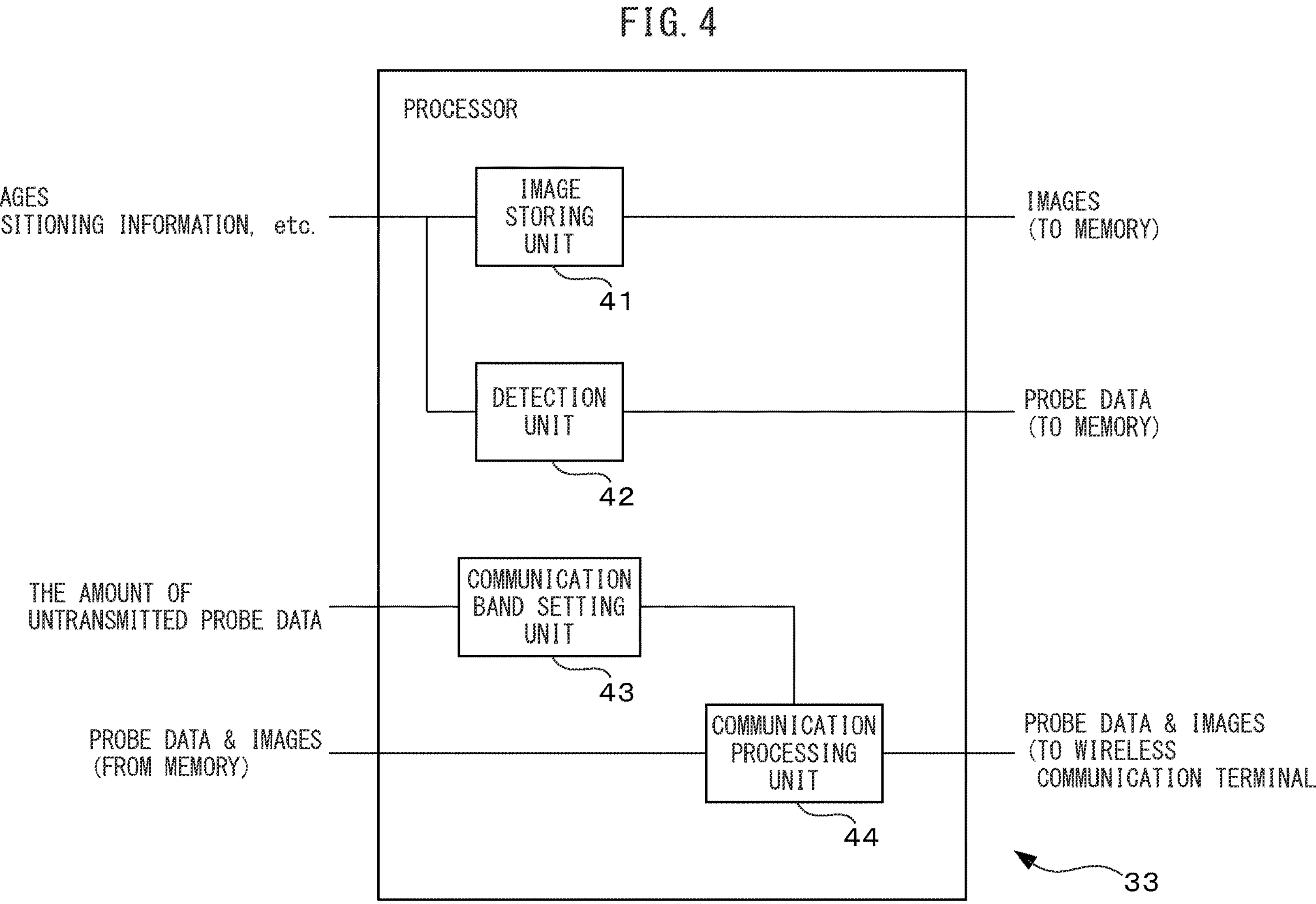
FIG. 4 is a functional block diagram of a processor of the data collecting device.

FIG. 4 is a functional block diagram of the processor 33 of the data collecting device 3. The processor 33 includes an image storing unit 41, a detection unit 42, a communication band setting unit 43, and a communication processing unit 44. These units included in the processor 33 are functional modules, for example, implemented by a computer program executed by the processor 33, or may be dedicated operating circuits provided in the processor 33.

Every time an image is received by the data collecting device 3 from the camera 21, the image storing unit 41 writes the image in the image storing area of the memory 32. Every time an image is received from the camera 21, the image storing unit 41 associates the position of the vehicle 2 indicated by the latest positioning information and the orientation of the vehicle 2 indicated by an orientation sensor (not illustrated) with the image. The image storing unit 41 may also associate parameters of the camera 21, such as the focal length, the mounted position, and the orientation of the camera 21, with the image. The information associated with an image is uploaded to the server 4, together with the image itself, when the image is uploaded to the server 4. When the image storing area becomes full, the image storing unit 41 overwrites images stored in the image storing area with newly stored images in chronological order.

The detection unit 42 detects a predetermined feature from the latest image generated by the camera 21 during travel of the vehicle 2 every predetermined period or every time the vehicle 2 travels a predetermined distance. The predetermined feature is a feature represented in a map to be generated or updated, and is, for example, one of various road markings or traffic signs, a curbstone, a guardrail, or a pole for installing traffic lights or a traffic sign. The detection unit 42 generates probe data representing the type and the position of the feature detected in the image.

For example, the detection unit 42 inputs the image into a classifier to detect a predetermined feature represented in the inputted image. As such a classifier, the detection unit 42 can use a deep neural network (DNN) having architecture of a convolutional neural network (CNN) type, such as Single Shot MultiBox Detector or Faster R-CNN. Alternatively, as such a classifier, the detection unit 42 may use a DNN having architecture of a self-attention network (SAN) type, such as Vision Transformer, or a classifier based on another machine learning technique, such as an AdaBoost classifier. Such a classifier is trained in advance with a large number of training images representing a predetermined feature that is a detection target in accordance with a predetermined training technique, such as backpropagation, so as to detect the feature from an image. The classifier outputs information indicating a region including a detection target feature in the inputted image, e.g., a circumscribed rectangle of the detection target feature (hereafter an "object region"), and information indicating the type of the feature represented in the object region.

The detection unit 42 estimates the position of a feature represented in an object region detected from an image, based on the direction from the camera 21 to a position corresponding to the centroid of the object region, the position and the travel direction of the vehicle 2 at the time of generation of the image, and parameters of the camera 21, such as the orientation, the focal length, and the mounted position. The detection unit 42 generates probe data including information indicating the type and the estimated position of the detected feature. In the probe data, the detection unit 42 may further include information indicating the position and the travel direction of the vehicle 2 at the time of generation of the image, and further include information indicating the size and the position in the image of the object region. The detection unit 42 generates a single piece of probe data for each detected feature. Thus, when multiple features are detected from an image, multiple pieces of probe data are generated from the image.

Every time probe data is generated, the detection unit 42 writes the generated probe data in the probe storing area of the memory 32. When the probe storing area becomes full, the detection unit 42 overwrites probe data stored in the probe storing area with newly stored probe data in chronological order.

The communication band setting unit 43 sets a communication band used for transmitting probe data among a communication band usable by the data collecting device 3 for transmitting collection target data in a communication channel between the wireless communication terminal 23 and the server 4, depending on the amount of a set of untransmitted probe data stored in the probe storing area. Specifically, the communication band setting unit 43 preferentially sets the communication band, regardless of the whole size of the communication band usable for transmitting collection target data, so that all of the set of untransmitted probe data can be transmitted to the server 4 via the wireless communication terminal 23. In the following, the communication band used for transmitting probe data will be referred to as the "probe communication band."

For example, the communication band setting unit 43 sets the probe communication band at the timing when the vehicle 2 enters a collection target region or when wireless communication between the wireless communication terminal 23 and the wireless base station 6 is enabled. Further, the communication band setting unit 43 may reset the probe communication band at the timing when the communication bandwidth between the wireless communication terminal 23 and the wireless base station 6 varies by more than a predetermined amount. Alternatively, the communication band setting unit 43 may reset the probe communication band at the timing when the ratio of the amount of a set of untransmitted probe data to the probe storing area (hereafter the "untransmitted data occupancy") exceeds a predetermined threshold (e.g., 0.5 to 0.8).

When the probe communication band is set at the timing of entry of the vehicle 2 into a collection target region, the communication band setting unit 43 determines whether the vehicle 2 has entered a collection target region, by referring to information indicating the collection target region and the latest positioning information stored in the memory 32. A collection target region is specified, for example, in units of one or more continuous road sections or a region of a predetermined shape. When a collection target region is specified as a road section, information indicating the collection target region includes identifying information for identifying the road section and information indicating the positions of ends at which the road section can be entered or exited. When a collection target region is a region of a predetermined shape, information indicating the collection target region includes information indicating the position of the outer edge of the region. The communication band setting unit 43 determines that the vehicle 2 has entered a collection target region, when the position of the vehicle 2 indicated by the latest positioning information is within a region or a road section indicated by information indicating the collection target region.

The communication band setting unit 43 divides the number of pieces of probe data generated in a most recent predetermined period by the length of the predetermined period to calculate the number of pieces of probe data generated per unit time. The communication band setting unit 43 then multiplies the number of pieces of probe data generated per unit time by the amount of data per piece of probe data to calculate the amount of probe data stored in the memory 32 per unit time. In addition, the communication band setting unit 43 sets the probe communication band to a band corresponding to a transmission speed of the amount of data per unit time obtained by multiplying the amount of probe data stored in the memory 32 per unit time by a predetermined factor depending on the amount of a set of untransmitted probe data. In some embodiment, the predetermined factor is set to a larger value as the amount of untransmitted probe data is greater. In this way, the probe communication band is widened as the amount of a set of probe data stored in the memory 32 increases. The predetermined factor is set to a value greater than 1 (e.g., 1.2 to 2) when the untransmitted data occupancy is not less than the predetermined threshold. Thus, an increase in the amount of untransmitted probe data will result in transmission of probe data being faster than writing of probe data. In other words, the amount of probe data that can be transmitted to the server 4 per unit time will be greater than the amount of probe data stored in the probe storing area per unit time. This enables all of the set of untransmitted probe data to be transmitted to the server 4. Further, even if untransmitted probe data increases while wireless communication between the wireless communication terminal 23 and the wireless base station 6 is temporarily disabled, the data collecting device 3 can decrease the untransmitted data occupancy after a restart of wireless communication.

Alternatively, the communication band setting unit 43 may set the probe communication band corresponding to the untransmitted data occupancy by referring to a communication band table representing the relationship between the untransmitted data occupancy and the probe communication band. Even in this case, the probe communication band is set in the communication band table so that transmission of probe data may be faster than writing of probe data when the untransmitted data occupancy is not less than the predetermined threshold. The communication band table may be prestored in the memory 32.

Every time the probe communication band is set, the communication band setting unit 43 notifies the communication processing unit 44 of the set probe communication band.

The communication processing unit 44 transmits collection target data stored in the memory 32 to the server 4 via the wireless communication terminal 23.

The communication processing unit 44 determines whether the vehicle 2 has entered a collection target region, by referring to information indicating the collection target region and the latest positioning information, as described in relation to the communication band setting unit 43. When the vehicle 2 enters a collection target region, the communication processing unit 44 transmits collection target data of the collection target region specified in a collection instruction signal to the server 4 via the wireless communication terminal 23.

More specifically, when probe data is specified as collection target data, the communication processing unit 44 transmits probe data stored in the probe storing area of the memory 32 to the server 4 via the wireless communication terminal 23 in chronological order.

When probe data and images are specified as collection target data, the communication processing unit 44 transmits probe data stored in the probe storing area of the memory 32 and images stored in the image storing area of the memory 32, respectively, to the server 4 via the wireless communication terminal 23 in chronological order.

An image specified as collection target data may be a sub-image. In this case, for each image stored in the image storing area, the communication processing unit 44 cuts out an area assumed to represent a road surface from the image to generate a sub-image. The communication processing unit 44 transmits probe data stored in the probe storing area of the memory 32 and the generated sub-images to the server 4 via the wireless communication terminal 23 in chronological order.

Further, an image specified as collection target data may be a feature image in which a notable region is highlighted. In this case, the communication processing unit 44 executes an operation for extracting a feature on each image stored in the image storing area to generate a feature image. Examples of the operation for extracting a feature include an edge enhancement filtering operation and an edge detection filtering operation. The communication processing unit 44 transmits probe data stored in the probe storing area of the memory 32 and the generated feature images to the server 4 via the wireless communication terminal 23 in chronological order.

The communication processing unit 44 transmits probe data to the server 4, using the probe communication band set by the communication band setting unit 43. In this way, the preferentially set probe communication band is used for transmitting probe data, regardless of the whole size of the communication band usable for transmitting collection target data, resulting in probe data being uploaded to the server 4 prior to other collection target data. When collection target data includes data other than probe data (images, sub-images, or feature images), the communication processing unit 44 further transmits the data to the server 4, using the remaining communication band other than the probe communication band in the communication band usable for transmitting collection target data. When collection target data includes only probe data, the communication processing unit 44 transmits the probe data, using the whole communication band usable for transmitting collection target data.

For example, when time division is applicable to the communication band, the communication processing unit 44 sets the length of a subframe used for transmitting probe data in a single frame (hereafter a "probe subframe") to a length depending on the probe communication band. More specifically, the communication processing unit 44 sets the length of a probe subframe so that the product of the amount of transmitted data per frame and the ratio of the length of a probe subframe to that of a frame equals the probe communication band.

For each frame, the communication processing unit 44 transmits probe data, in the probe subframe, to the server 4 via the wireless communication terminal 23, and transmits collection target data other than probe data, in the remaining subframe of the frame, to the server 4 via the wireless communication terminal 23.

Figures 5A, 5B:
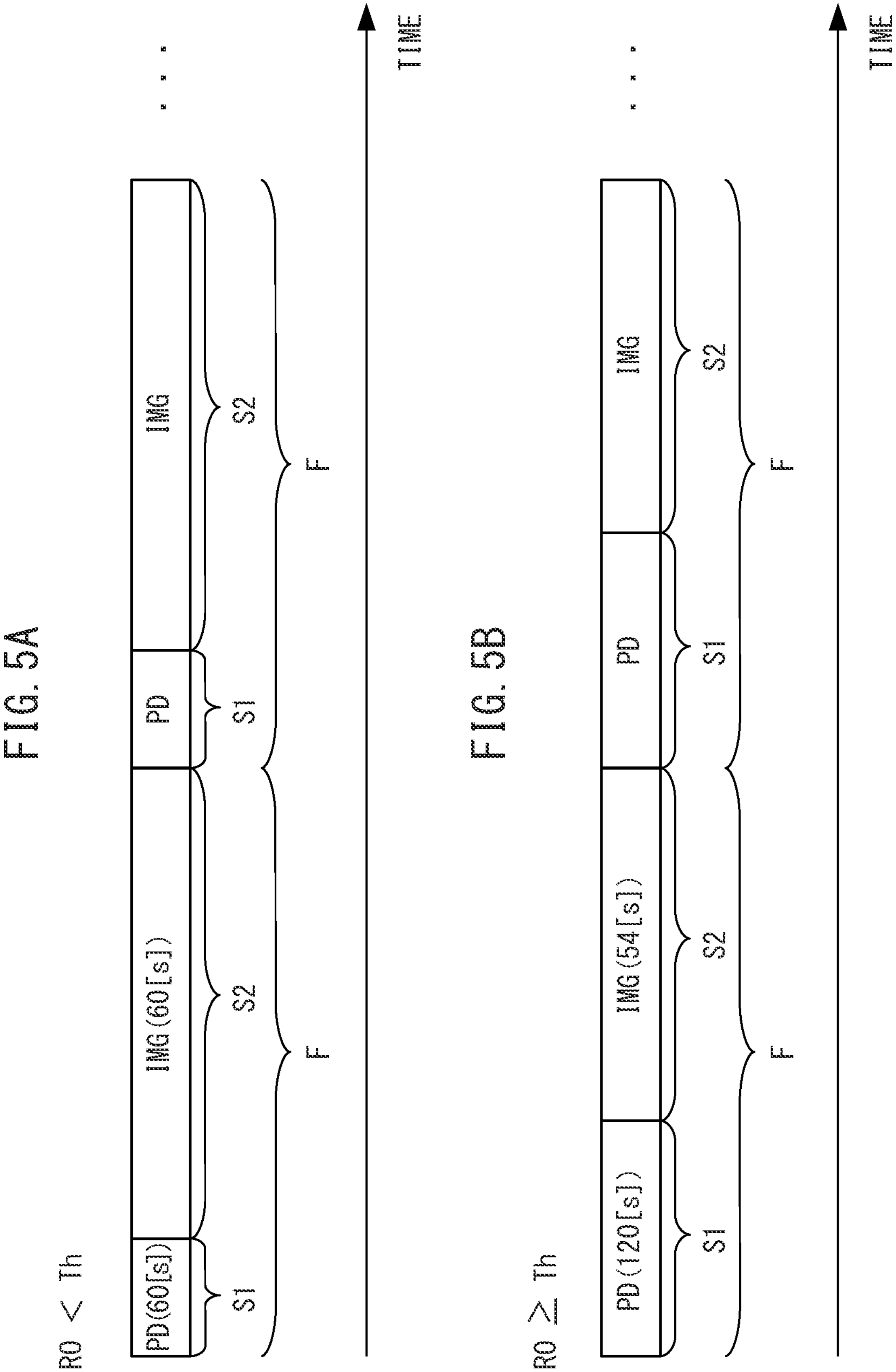
FIG. 5A illustrates an example of the relationship between the amount of untransmitted probe data and collection target data to be uploaded to a server per frame.
FIG. 5B illustrates an example of the relationship between the amount of untransmitted probe data and collection target data to be uploaded to a server per frame.

FIGS. 5A and 5B illustrate examples of the relationship between the amount of untransmitted probe data and collection target data to be uploaded to the server 4 per frame. The horizontal axes in FIGS. 5A and 5B represent time.

In the example illustrated in FIG. 5A, the untransmitted data occupancy RO is less than a predetermined threshold Th. In this case, for each frame F, the communication processing unit 44 transmits probe data obtained during 60-second travel of the vehicle 2, in a probe subframe S1, and transmits images obtained during 60-second travel of the vehicle 2, in the remaining subframe S2.

In the example illustrated in FIG. 5B, the untransmitted data occupancy RO is not less than the predetermined threshold Th. In this case, for each frame F, the communication processing unit 44 transmits probe data obtained during 120-second travel of the vehicle 2, in a probe subframe S1, and transmits images obtained during 54-second travel of the vehicle 2, in the remaining subframe S2.

When a multiplexing scheme other than time division is usable in communication between the data collecting device 3 and the server 4, the communication processing unit 44 secures the set probe communication band in accordance with the multiplexing scheme.

Further, the communication processing unit 44 deletes the collection target data transmitted to the server 4 via the wireless communication terminal 23 from the memory 32.

When the vehicle 2 exits a collection target region, the communication processing unit 44 identifies collection target data untransmitted at the time of this exit, by referring to the memory 32. When transmission of the identified collection target data to the server 4 is completed, the communication processing unit 44 finishes transmission of collection target data. The communication processing unit 44 determines whether the vehicle 2 has exited a collection target region, by referring to information indicating the collection target region and the latest positioning information, similarly to determination whether the vehicle 2 has entered a collection target region.

FIG. 6 is an operation flowchart of a process related to generation of probe data and storage of probe data and images in the data collecting process. The processor 33 executes a process related to generation of probe data and storage of probe data and images in accordance with the operation flowchart described below every predetermined period or every time the vehicle 2 travels a predetermined distance.

The image storing unit 41 of the processor 33 writes an image received by the data collecting device 3 from the camera 21 in the image storing area of the memory 32 (step S101). The detection unit 42 of the processor 33 detects a predetermined feature from the latest image, and generates probe data representing the detected feature (step S102). The detection unit 42 writes the generated probe data in the probe storing area of the memory 32 (step S103).

Figure 7:
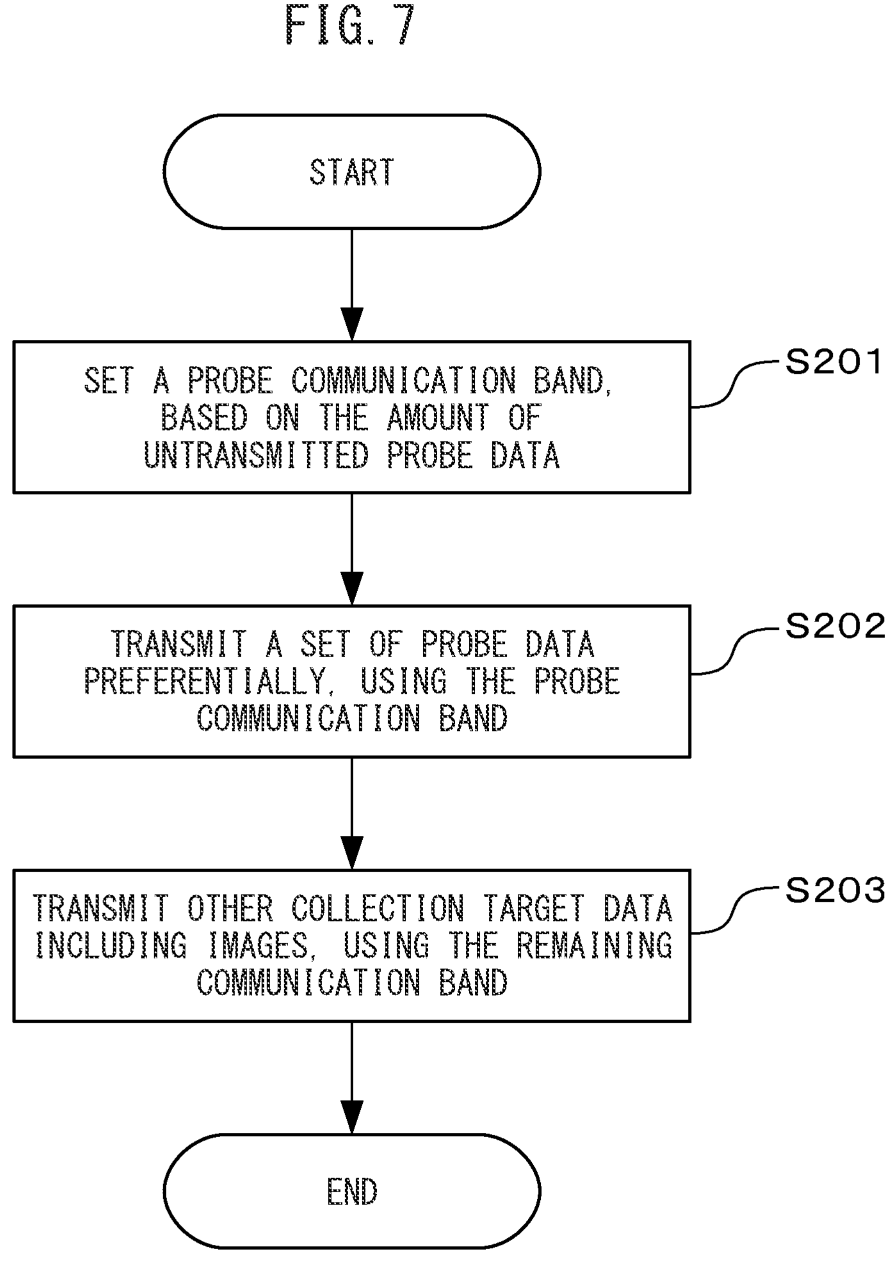
FIG. 7 is an operation flowchart of a process related to upload of collection target data in the data collecting process.

FIG. 7 is an operation flowchart of a process related to upload of collection target data in the data collecting process. The processor 33 executes a process related to upload of collection target data in accordance with the operation flowchart described below when the vehicle 2 enters a collection target region.

The communication band setting unit 43 of the processor 33 sets a probe communication band, based on the amount of untransmitted probe data stored in the probe storing area of the memory 32 (step S201).

The communication processing unit 44 of the processor 33 transmits a set of untransmitted probe data stored in the probe storing area of the memory 32 to the server 4, using the set probe communication band, prior to other collection target data (step S202). Further, the communication processing unit 44 transmits other collection target data, such as a set of images stored in the image storing area of the memory 32, to the server 4 via the wireless communication terminal 23, using the remaining communication band in the communication band usable for transmitting collection target data (step S203). The processor 33 then finishes the process related to upload of collection target data.

The following describes the server 4. The server 4 stores probe data or images transmitted from the data collecting devices 3 mounted on the respective vehicles 2. Based on the probe data or the images, the server 4 generates or updates a map of a collection target region. In addition, the server 4 notifies the individual vehicles 2 of a collection target region. In addition, the server 4 specifies the type of data to be collected for the collection target region, and notifies the individual vehicles 2 of a collection instruction signal indicating data of the specified type as collection target data.

Figure 8:
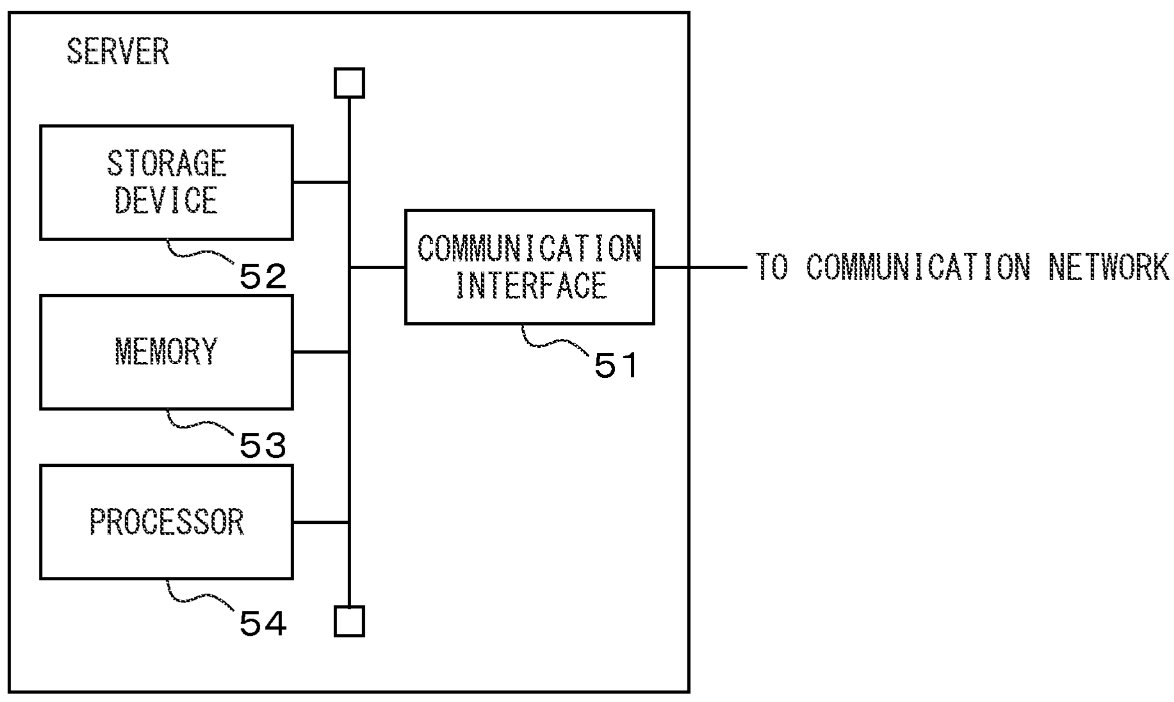
FIG. 8 illustrates the hardware configuration of the server.
Figure 8:

FIG. 8 illustrates the hardware configuration of the server 4. The server 4 includes a communication interface 51, a storage device 52, a memory 53, and a processor 54. The communication interface 51, the storage device 52, and the memory 53 are connected to the processor 54 via a signal line. The server 4 may further include an input device, such as a keyboard and a mouse, and a display device, such as a liquid crystal display.

The communication interface 51, which is an example of a communication unit, includes an interface circuit for connecting the server 4 to the communication network 5. The communication interface 51 is configured to be communicable with the data collecting devices 3 mounted on the respective vehicles 2, via the communication network 5 and the wireless base station 6. More specifically, the communication interface 51 passes, to the processor 54, collection target data and other data received from the data collecting devices 3 of the respective vehicles 2 via the wireless base station 6 and the communication network 5. The communication interface 51 transmits a collection instruction signal received from the processor 54 and other signals to the data collecting devices 3 of the respective vehicles 2 via the communication network 5 and the wireless base station 6.

The storage device 52, which is an example of a storage unit, includes, for example, a hard disk drive, or an optical medium and an access device therefor. The storage device 52 stores type-specifying information, collection target data collected for each of road sections, and other data. The storage device 52 may further store identifying information of the individual vehicles 2, a computer program executed by the processor 54 for executing a data collecting process on the server 4 side, and a map to be generated or updated based on collection target data.

The memory 53, which is another example of a storage unit, includes, for example, nonvolatile and volatile semiconductor memories. The memory 53 temporarily stores various types of data generated during execution of the data collecting process, and various types of data obtained by communication with the individual vehicles 2, such as probe data and images.

The processor 54, which is an example of a control unit, includes one or more central processing units (CPUs) and a peripheral circuit thereof. The processor 54 may further include another operating circuit, such as a logic-arithmetic unit or an arithmetic unit. The processor 54 executes the data collecting process on the server 4 side.

The processor 54 generates a collection instruction signal to instruct the individual vehicles 2 to collect collection target data.

For each collection target region, the processor 54 refers to type-specifying information corresponding to the collection target region. Based on the type-specifying information, the processor 54 identifies, for each collection target region, the type of collection target data specified for the collection target region. Examples of the type of collection target data include an image representing environment around the vehicle 2 generated by the camera 21 mounted on the vehicle 2, a sub-image representing a road surface cut out from the image, and probe data representing a feature detected from the image. Thus, for each collection target region, the type-specifying information indicates an image, a sub-image, or probe data, as the type of collection target data.

The processor 54 includes information for specifying the identified type of collection target data in the collection instruction signal. When the type-specifying information indicates probe data, the processor 54 specifies only probe data as collection target data. When the type-specifying information indicates an image, the processor 54 specifies probe data and images as collection target data. When the type-specifying information indicates a sub-image, the processor 54 specifies probe data and sub-images as collection target data.

The processor 54 transmits the generated collection instruction signal to the individual vehicles 2 via the communication interface 51, the communication network 5, and the wireless base station 6.

The processor 54 may set a collection target region, based on the number of pieces of probe data collected for individual road sections stored in the storage device 52. For example, the processor 54 sets a road section where the number of pieces of probe data collected in a most recent predetermined period (e.g., several weeks to several months) is less than a predetermined collection threshold, as a collection target region. Alternatively, of individual road sections represented in a map to be updated, the processor 54 may set a road section such that the time elapsed since the last update is not less than a predetermined elapsed time threshold, as a collection target region. The processor 54 then notifies the set collection target region to the data collecting devices 3 of the respective vehicles 2 via the communication interface 51.

In addition, the processor 54 may generate or update a map, using the collected probe data and images. In this case, the processor 54 executes registration between features represented in each piece of probe data collected for a continuous section by a single vehicle 2 and corresponding features represented in previously collected probe data or in the map to be updated. Of the features represented in each piece of probe data collected for the continuous section, the processor 54 identifies one that does not have a corresponding feature in the previously collected probe data or the map to be updated, as a newly installed feature. The processor 54 adds information on the identified feature (position and type) to the map to be generated or updated. Further, of the features represented in the map to be updated, the processor 54 may identify one that does not have a corresponding feature among the features represented in each piece of probe data collected for the continuous section, as a removed one. The processor 54 may delete information on the feature identified as a removed one, from the map to be updated.

As described above, the data collecting device sets a probe communication band used for transmitting probe data in a communication band of a communication channel between the communication device and the server, based on the amount of untransmitted probe data. The data collecting device transmits a set of probe data stored in the memory to the server via the communication device, using the probe communication band, prior to a set of images stored in the memory. In addition, the data collecting device transmits collection target data other than probe data to the server via the communication device, using the remaining communication band other than the probe communication band in the communication band of the communication channel. In this way, the probe communication band is preferentially set, regardless of the whole size of the communication band usable for transmitting collection target data. The data collecting device can therefore transmit a set of probe data obtained over a continuous section of a certain length to the server without loss.

In some cases, images generated during travel of the vehicle 2 in a collection target region and untransmitted may remain in the image storing area after the completion of transmission of a set of probe data generated during travel of the vehicle 2 through a section passing through the collection target region and having a predetermined length. According to a modified example, in such cases, the communication processing unit 44 may transmit these images to the server 4 via the wireless communication terminal 23 prior to other probe data stored in the probe storing area. In this way, the data collecting device 3 can prevent images generated in the collection target region from being deleted without being transmitted to the server 4, to avoid a decrease in the accuracy of registration on the server 4 side.

The communication processing unit 44 determines the length of the section where individual pieces of probe data transmitted to the server 4 are generated, by referring to the positions of the vehicle 2 included in these pieces of probe data, from when the vehicle 2 enters the collection target region and starts transmitting probe data. When the length reaches the predetermined length, the communication processing unit 44 gives priority to transmission of images, as described above. The communication processing unit 44 can transmit images prior to probe data, by stopping transmission of probe data until the completion of transmission of images.

According to another modified example, the image storing unit 41 may discard images received from the camera 21 without storing them in the image storing area while the vehicle 2 is traveling outside a collection target region. Similarly, the detection unit 42 may stop generating probe data while the vehicle 2 is traveling outside a collection target region. In this case, the image storing unit 41 and the detection unit 42 determine whether the position of the vehicle 2 is within a collection target region, by referring to information indicating the collection target region and the latest positioning information, as described in relation to the communication band setting unit 43.

As described above, those skilled in the art may make various modifications according to embodiments within the scope of the present disclosure.

What is claimed is:

1. A data collecting device comprising:

a processor configured to:

store an image representing an area around a vehicle and generated by a camera mounted on the vehicle during travel of the vehicle in a memory, detect a predetermined feature from the image, generate probe data representing the detected feature, store the generated probe data in the memory, divide a number of pieces of probe data generated in a most recent predetermined period by a length of the predetermined period to calculate the number of pieces of probe data generated per unit time, multiply the number of pieces of probe data generated per unit time by an amount of data per piece of probe data to calculate an amount of probe data stored in the memory per unit time, set a probe communication band in a communication band of a communication channel between a communication device mounted on the vehicle and a server, corresponding to a transmission speed of the amount of data per unit time, obtained by multiplying the amount of probe data stored in the memory per unit time by a predetermined factor depending on an amount of a set of untransmitted probe data, so that all of the set of the probe data is transmitted to the server via the communication device, transmit the set of the probe data to the server via the communication device, using the probe communication band, prior to a set of the images stored in the memory, and transmit the set of the images to the server via the communication device, using a remaining communication band other than the probe communication band in the communication band of the communication channel.

2. The data collecting device according to claim 1, wherein when the image generated during travel of the vehicle in a collection target region and untransmitted is stored in the memory after transmission to the server of a set of the probe data generated over a section passing through the collection target region and having a predetermined length, the processor transmits the untransmitted image to the server via the communication device prior to other probe data stored in the memory.

3. The data collecting device according to claim 1, wherein the processor widens the probe communication band as the amount of the set of the probe data stored in the memory increases.

4. The data collecting device according to claim 3, wherein when a ratio of the amount of the set of the probe data to a storage area for storing the probe data in the memory is not less than a predetermined threshold, the processor sets the probe communication band so that the amount of the probe data that is transmitted to the server per unit time is greater than the amount of the probe data stored in the storage area per unit time in a most recent predetermined period.

5. A method for collecting data, comprising:

storing an image representing an area around a vehicle and generated by a camera mounted on the vehicle during travel of the vehicle in a memory;

detecting a predetermined feature from the image;

generating probe data representing the detected feature;

storing the generated probe data in the memory;

dividing a number of pieces or probe data generated in a most recent predetermined period by a length of the predetermined period to calculate the number of pieces of probe data generated per unit time;

multiplying the number of pieces of probe data generated per unit time by an amount of data per piece of probe data to calculate an amount of probe data stored in the memory per unit time;

setting a probe communication band in a communication band of a communication channel between a communication device mounted on the vehicle and a server, corresponding to a transmission speed of the amount of data per unit time obtained by multiplying the amount of probe data stored in the memory per unit time by a predetermined factor depending on an amount of a set of untransmitted probe data, so that all of the set of the probe data is transmitted to the server via the communication device;

transmitting the set of the probe data to the server via the communication device, using the probe communication band, prior to a set of the images stored in the memory; and transmitting the set of the images to the server via the communication device, using a remaining communication band other than the probe communication band in the communication band of the communication channel.

6. A data collecting system comprising a data collecting device and a server communicably connected to the data collecting device, the data collecting device being mounted on a vehicle and comprising:

a memory; and a processor configured to:

store an image representing an area around the vehicle and generated by a camera mounted on the vehicle during travel of the vehicle in the memory, detect a predetermined feature from the image, generate probe data representing the detected feature, store the generated probe data in the memory, divide a number of pieces of probe data generated in a most recent predetermined period by a length of the predetermined period to calculate the number of pieces of probe data generated per unit time, multiply the number of pieces of probe data generated per unit time by an amount of data per piece of probe data to calculate an amount of probe data stored in the memory per unit time, set a probe communication band in a communication band of a communication channel between a communication device mounted on the vehicle and the server, corresponding to a transmission speed of the amount of data per unit time obtained by multiplying the amount of probe data stored in the memory per unit time by a predetermined factor depending on an amount of a set of untransmitted probe data, so that all of the set of the probe data is transmitted to the server via the communication device, transmit the set of the probe data to the server via the communication device, using the probe communication band, prior to a set of the images stored in the memory, and transmit the set of the images to the server via the communication device, using a remaining communication band other than the probe communication band in the communication band of the communication channel.

* * * * *